Aug. 6, 1935.    G. MEYER    2,010,160
INSTRUMENT FOR TEACHING CALCULATION
Filed Nov. 25, 1933
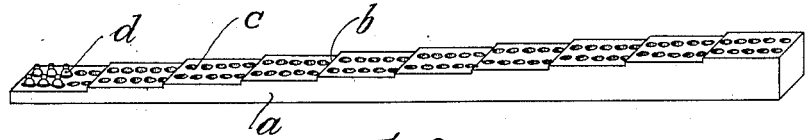
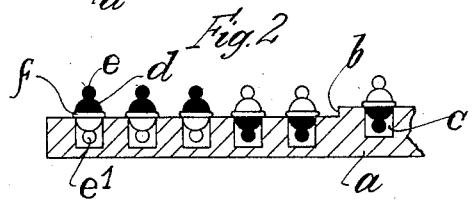
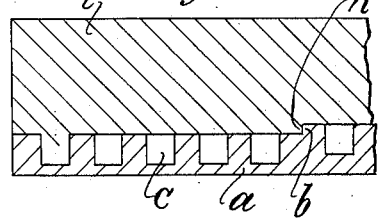  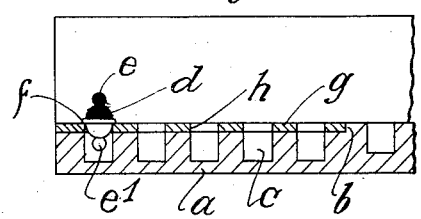
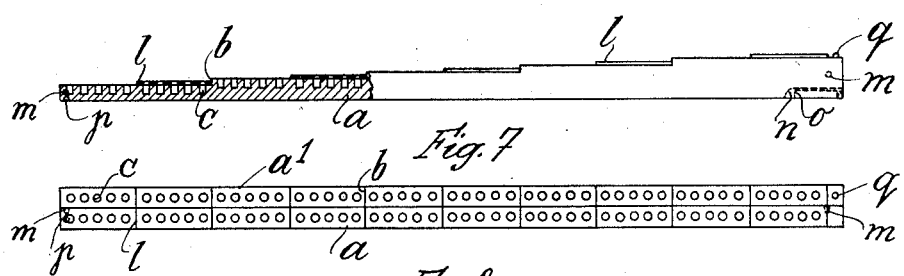
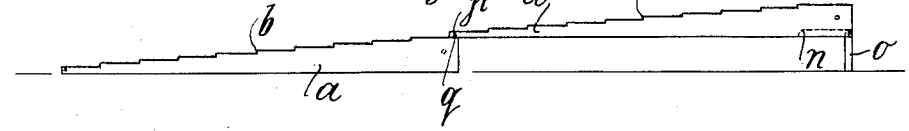

Patented Aug. 6, 1935

2,010,160

UNITED STATES PATENT OFFICE 2,010,160

INSTRUMENT FOR TEACHING CALCULATION

Gerhard Meyer, Grabstede in Oldenburg, Germany

Application November 25, 1933, Serial No. 699,738
In Germany February 29, 1932

5 Claims. (Cl. 35—32)

This invention relates to an instrument for teaching and learning calculation and which is to be used chiefly by the scholars themselves.

Calculating instruments are known which are provided with for example one hundred recesses arranged in rows and designed for the insertion of calculating elements.

The object of the invention is, to facilitate the learning of decimal calculations by a bar-shaped board with steps.

The invention consists in that two rows each of fifty recesses are provided on a long narrow bar which in one embodiment has ten steps and in another five steps ascending from the left to the right, each step having two rows of for example five recesses so that each step forms a narrow surface in which there are at least ten calculating elements, so that the attention of the child is concentrated on a small surface and the child can easily be taught to count and calculate.

Further features of the invention consist in the arrangement of supplementing bars for the steps and in the employment of cover bars for one row of holes and in the construction of the calculating elements.

The invention presents the advantage that it is suitable for teaching figures, that is for initiating in the instruction of calculation, and facilitates the quick learning of figures.

At the same time the instrument is of simple construction and convenient to manipulate. It enables all kinds of calculations to be carried out, and is particularly suitable for facilitating the numerical conception of numbers. The child will be impressed when going from one decimal of numbers to another decimal. When the child advances sufficiently in knowledge of numbers, he becomes able to use both rows of apertures whereas up to that time only one row is used, the other row being concealed.

The instrument according to the invention can be constructed in various ways. Several forms of construction are illustrated by way of example in the accompanying drawing in which:—

Fig. 1 shows in perspective view a calculating bar with ten steps for teaching calculation.

Fig. 2 shows in longitudinal section on a larger scale a portion of the instrument with inserted calculating elements.

Fig. 3 shows the instrument as counting apparatus.

Fig. 4 is an enlarged sectional view on line IV—IV of Fig. 3.

Fig. 5 is an enlarged sectional view on line V—V of Fig. 3 with inserted supplementary steps.

Fig. 6 is a side elevation partly in longitudinal section of a modified form of construction of the calculating bar.

Fig. 7 is a top plan view of the two bars arranged side by side.

Fig. 8 shows in side elevation the two bars fitted together for calculating up to one hundred.

The calculating instrument consists of a relatively long narrow bar $a$ which may be so constructed that it can be taken to pieces or folded, and which has two rows each comprising fifty holes $c$. The holes need only be recesses and serve for accommodating calculating elements $d$. The bar $a$ is subdivided into steps $b$ which ascend from the left to the right. As shown by the example illustrated ten steps $b$ may be provided, each of which has two rows each comprising five recesses.

The calculating elements $d$ are constructed like a double figure and consist of a rotatable body having for example a spherical middle portion: ball shaped projections $e$, $e_1$ of small diameter are provided one at each end of the vertical diameter of the element and serve for gripping the calculating element.

The diameter of the calculating elements is smaller than the diameter of the recesses in the calculating board and, as shown in Figs. 2 and 3, a collar $f$ of larger diameter than the recesses is arranged around the centre of each calculating element so that, when this collar rests on the board, the two projections are vertically above the middle of the recesses $c$, one projection being within the recess and the other outside the same. The two halves of the body may be of the same shape and size but differently colored.

The calculating elements may be of different tasteful design, for example in the shape of a doll. They may simulate figures in certain costumes, national costumes and the like, so as to encourage the child to use the instrument.

Each recess serves for accommodating one calculating element. The calculating elements may appear now in one color and then in another color according to the construction.

The learning of the decimal system is greatly facilitated. In the first step it is possible to calculate for example as follows:— two+seven=nine

● ○○○○

● ○○○

For example two black figures and then seven other figures are visible. The learning of the decimal place is illustrated by the following example:— six+seven=thirteen

●●● ○○○○

●●● ○○○

Herein the black dots represent counters $d$ inserted with one color up and the circle counters with the other color up.

In this instance, for example, six black figures are inserted in the first step and then seven other figures must be added. The child will then see that it is necessary to pass from one step to the next, namely that the decimal next following ten has been reached.

As shown in Figs. 3 to 5 supplementary steps $g$ are added according to the invention and are of the same height as a step $b$ so that surfaces are produced which have ten holes or recesses in a row. The supplementary steps $g$ are provided with holes which correspond with the recesses $c$ in the calculating bar situated thereunder, so that the supplementary steps can be connected with the calculating bar situated thereunder merely by the inserted counters. Very low steps may be arranged so that no thick bar is formed. If necessary the supplementary steps may also be provided with pin connections or the like.

In order to facilitate the counting of the first row from one to fifty in the steps each having ten recesses, a cover bar $i$ is provided for the second row. This cover bar $i$ has on its under side steps $k$ exactly corresponding to the steps of the calculating bar. This cover bar $i$ need not have any holes.

By these supplementary steps all "jumps", that is changes in the direction of counting, are eliminated in the counting space from one to fifty and at the same time the counting row is clearly shown in decimal arrangement. It is also possible to clearly determine the value of each number of several decimals in a simple manner with a lineal measuring device such as a ruler divided into centimetres. Thus also important possibilities of comparison are obtained, for example "Thirty"=thirty centimetres long, "Thirty five" =thirty five centimetres long, thirty five is therefore five centimetres long. Such measuring practice is extremely important as foundation for the instruction of calculation. It gives confidence to the child for the size proportions of numbers. It is also among the best bases for the quantitive conception of our surroundings.

If each child has such a calculating instrument, and as all the instruments can be fitted together, two children can also represent the numbers from one to one hundred. Twenty children could represent the numbers up to one thousand as a long row ascending in steps.

Instead of the arrangement illustrated in Figs. 1 to 5 the instrument may be constructed as shown in Figs. 6 to 8, each bar having only five steps each of which has ten recesses $c$ in each row. The steps $b$ can then be made somewhat higher and shorter. Thin bars $l$ having a thickness of only half the height of the steps may be used as supplementary steps. By this construction it is possible to continually count up to ten in each row of steps. If it is desired to practice addition and subtraction, the supplementary steps $l$ can then be inserted which again reduce the individual steps to five recesses in each row.

Figs. 6 and 7 show that the calculating instrument may be composed of two separate bars $a$, $a_1$ each having fifty recesses. These two bars can be interconnected by pins $m$ in one part which engage in holes in the other part, so that the bars lie side by side as shown in Fig. 7. The two bars may, however, also be arranged one behind the other as shown in Fig. 8, so that one hundred recesses lie in a continuous row one behind the other.

For the purpose of setting up the calculating instrument, the second bar $a_1$ placed on the bar $a$ is provided at one end with a hingedly mounted support $o$ adapted to be swung out of a cavity $n$. When the instrument is thus set up, two bars $a$ each with fifty recesses are obtained the one following the other so that it is possible to count up to one hundred.

For the purpose of connecting the two bars the bar $a_1$ has in its under side a cavity $p$ in which a pin $q$ on the other bar can engage.

I claim:—

1. A calculating instrument comprising in combination at least one calculating bar having a plurality of steps ascending from the left end to the right end of the bar, each step being provided with a plurality of recesses, calculating elements adapted to be inserted in said recesses, supplementary steps adapted to be placed on said bar to change the number of recesses in the bar steps, said supplementary steps having holes corresponding to the recesses in the bar steps and adapted to receive said calculating elements to connect said supplementary steps to said bar.

2. A calculating instrument, comprising in combination at least one calculating bar having a plurality of steps ascending from the left end to the right end of the bar and each step provided with a plurality of recesses, a cover bar, the under side of said cover bar corresponding to the steps on said calculating bar, said cover bar adapted to be placed on said calculating bar to cover one row of fifty recesses therein.

3. In a calculating instrument, at least one calculating bar having a plurality of steps ascending from the left end to the right end of the bar and each step provided wtih a plurality of recesses, calculating elements adapted to be inserted in said recesses each calculating element comprising a body of spherical shape, and two ball shaped projections one at each end of a diameter of said body and of smaller diameter than the same body, said projections adapted to facilitate the manipulation of the elements.

4. An instrument for teaching calculation, comprising in combination two long narrow bars having fifty recesses arranged in one row, five steps on each bar ascending from the left end to the right end of the bar, each step having ten recesses, and calculating elements to be inserted in said recesses, said two bars to be placed the one behind the other to form together one long bar having one hundred recesses.

5. An instrument for teaching calculation, comprising in combination a long narrow bar, five steps on said bar ascending from the left to the right each step having ten recesses arranged in one row, five short bars of half the length and height of a step in said long bar and having five recesses arranged in a row designed to cover each one half of a step of said long bar to change this long bar from a five step bar to a ten step bar.

GERHARD MEYER.